United States Patent
Long et al.

(10) Patent No.: US 9,872,198 B2
(45) Date of Patent: Jan. 16, 2018

(54) SYSTEMS AND METHODS FOR DATA TRANSMISSION

(71) Applicant: Tencent Technology (Shenzhen) Company Limited, Shenzhen (CN)

(72) Inventors: Xingping Long, Shenzhen (CN); Xinhai Zeng, Shenzhen (CN); Xiaomin Xu, Shenzhen (CN); Muyong Cao, Shenzhen (CN); Yuanjiang Peng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 161 days.

(21) Appl. No.: 14/918,731

(22) Filed: Oct. 21, 2015

(65) Prior Publication Data

US 2016/0044527 A1    Feb. 11, 2016

Related U.S. Application Data

(63) Continuation of application No. PCT/CN2013/088187, filed on Nov. 29, 2013.

(30) Foreign Application Priority Data

Jun. 3, 2013  (CN) .......................... 2013 1 0216072

(51) Int. Cl.
*H04W 28/02* (2009.01)
*H04L 1/16* (2006.01)
(Continued)

(52) U.S. Cl.
CPC ....... *H04W 28/0236* (2013.01); *H04L 1/1642* (2013.01); *H04L 1/1838* (2013.01);
(Continued)

(58) Field of Classification Search
CPC ............. H04W 28/0236; H04L 1/1642; H04L 1/1838; H04L 1/1858; H04L 43/0829; H04L 43/0864; H04L 47/54
See application file for complete search history.

(56) References Cited

U.S. PATENT DOCUMENTS

2003/0126238 A1* 7/2003 Kohno .................. H04L 1/0009
709/220
2007/0162810 A1* 7/2007 Sato ...................... H04L 1/1678
714/748

(Continued)

FOREIGN PATENT DOCUMENTS

CN      101399649 A      4/2009
CN      101588225 A     11/2009
(Continued)

OTHER PUBLICATIONS

Patent Cooperation Treaty, International Search Report and Written Opinion of the International Searching Authority, dated Mar. 6, 2014, in PCT/CN2013/088187.

(Continued)

*Primary Examiner* — Ajay Cattungal
(74) *Attorney, Agent, or Firm* — Jones Day

(57) ABSTRACT

Systems and methods are provided for data transmission. For example, packet loss is detected based on at least information associated with a first data packet; and in response to packet loss being detected, a packet-retransmission request is sent to a data-transmission terminal and the packet-retransmission request is repeatedly sent to the data-transmission terminal during a retransmission life-cycle associated with the first data packet, the packet-retransmission request including a first identification of the packet-retransmission request.

16 Claims, 4 Drawing Sheets

(51) Int. Cl.
*H04L 1/18* (2006.01)
*H04L 12/26* (2006.01)
*H04L 12/863* (2013.01)

(52) U.S. Cl.
CPC ........ *H04L 1/1858* (2013.01); *H04L 43/0829* (2013.01); *H04L 43/0864* (2013.01); *H04L 47/54* (2013.01)

(56) References Cited

U.S. PATENT DOCUMENTS

| | | | |
|---|---|---|---|
| 2008/0259964 A1* | 10/2008 | Tomita | H04L 1/1838 370/501 |
| 2010/0183012 A1* | 7/2010 | Konishi | H04L 1/1887 370/392 |
| 2014/0071993 A1* | 3/2014 | Sazawa | H04L 1/1642 370/412 |
| 2014/0160941 A1* | 6/2014 | Hui | H04W 24/10 370/241 |

FOREIGN PATENT DOCUMENTS

| | | |
|---|---|---|
| CN | 101697504 A | 4/2010 |
| CN | 103269260 A | 8/2013 |

OTHER PUBLICATIONS

Patent Cooperation Treaty, International Preliminary Report on Patentability, dated Dec. 8, 2015, in PCT/CN2013/088187.

\* cited by examiner

SYSTEMS AND METHODS FOR DATA TRANSMISSION

CROSS-REFERENCES TO RELATED APPLICATIONS

This application is a continuation of International Application No. PCT/CN2013/088187, with an international filing date of Nov. 29, 2013, now pending, which claims priority to Chinese Patent Application No. 201310216072.5, filed Jun. 3, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to data transmission. But it would be recognized that the invention has a much broader range of applicability.

Among current Internet applications, more and more need real-time data transmission. For example, real-time network video transmission and real-time audio transmission have high demands for real-time data transmission. For these applications related to real-time data transmission, there is usually a need to detect packet loss after a data packet is received. Upon detection of packet loss, a packet-retransmission request is often sent to a sender in order to promptly receive consecutive data packets and ensure the playback continuity. Current data transmission schemes often include: a packet-retransmission request is sent to the sender upon the detection of packet loss and another retransmission request is sent to the sender after a fixed period of time, in order to ensure that consecutive packets can be obtained. As such, the retransmission request is repeatedly sent after fixed time intervals. But the delay characteristic of network transmission can cause some problems. For example, a receiver may send multiple retransmission requests, and a sender receives these multiple retransmission requests and in response to each request carries out a retransmission so as to cause duplicate retransmissions of the data packets, which may take up unnecessary transmission bandwidth and affect network transmission performance.

Hence it is highly desirable to improve the techniques for data transmission.

BRIEF SUMMARY OF THE INVENTION

According to one embodiment, a method is provided for data transmission. For example, packet loss is detected based on at least information associated with a first data packet; and in response to packet loss being detected, a packet-retransmission request is sent to a data-transmission terminal and the packet-retransmission request is repeatedly sent to the data-transmission terminal during a retransmission life-cycle associated with the first data packet, the packet-retransmission request including a first identification of the packet-retransmission request.

According to another embodiment, a method is provided for data transmission. For example, a packet-retransmission request sent by a data-reception terminal is received, the packet-retransmission request including a first identification of the packet-retransmission request and a second identification of one or more first data packets that are lost; whether the packet-retransmission request is processed is determined based on at least information associated with the first identification; in response to the packet-retransmission request not being processed, the one or more first data packets are obtained based on at least information associated with the second identification and the one or more first data packets are sent to the data-reception terminal.

According to yet another embodiment, a data-reception terminal includes: a packet-reception module, a packet-loss-detection module, a life-cycle-determination module, and a retransmission-request module. The packet-reception module is configured to receive a first data packet sent by a data-transmission terminal. The packet-loss-detection module is configured to detect packet loss based on at least information associated with the first data packet. The life-cycle-determination module is configured to determine a retransmission life-cycle associated with the first data packet. The retransmission-request module is configured to, in response to packet loss being detected by the packet-loss-detection module, send a packet-retransmission request to the data-transmission terminal; and send the packet-retransmission request repeatedly to the data-transmission terminal during the retransmission life-cycle associated with the first data packet, the packet-retransmission request including a first identification of the packet-retransmission request.

In one embodiment, a data-transmission terminal includes: a retransmission-response module and a packet-transmission module. The retransmission-response module is configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification. The packet-transmission module is configured to, in response to the first packet-retransmission request not being processed, obtain the one or more first data packets based on at least information associated with the second identification and send the one or more first data packets to the data-reception terminal.

In another embodiment, a data transmission system includes a data-reception terminal and a data-transmission terminal. The data-reception terminal includes: a packet-reception module, a packet-loss-detection module, a life-cycle-determination module, and a retransmission-request module. The packet-reception module is configured to receive a first data packet sent by a data-transmission terminal. The packet-loss-detection module is configured to detect packet loss based on at least information associated with the first data packet. The life-cycle-determination module is configured to determine a retransmission life-cycle associated with the first data packet. The retransmission-request module is configured to, in response to packet loss being detected by the packet-loss-detection module, send a packet-retransmission request to the data-transmission terminal; and send the packet-retransmission request repeatedly to the data-transmission terminal during the retransmission life-cycle associated with the first data packet, the packet-retransmission request including a first identification of the packet-retransmission request. The data-transmission terminal includes: a retransmission-response module and a packet-transmission module. The retransmission-response module is configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification. The packet-transmission module is configured to, in response to the first packet-retransmission request not being processed, obtain the one or more first data packets based on at least information associated with the second identification and send the one or more first data packets to the data-reception terminal.

In yet another embodiment, a non-transitory computer readable storage medium includes programming instructions for data transmission. The programming instructions are configured to cause one or more data processors to execute certain operations. For example, packet loss is detected based on at least information associated with a first data packet; and in response to packet loss being detected, a packet-retransmission request is sent to a data-transmission terminal and the packet-retransmission request is repeatedly sent to the data-transmission terminal during a retransmission life-cycle associated with the first data packet, the packet-retransmission request including a first identification of the packet-retransmission request.

In yet another embodiment, a non-transitory computer readable storage medium includes programming instructions for data transmission. The programming instructions are configured to cause one or more data processors to execute certain operations. For example, a packet-retransmission request sent by a data-reception terminal is received, the packet-retransmission request including a first identification of the packet-retransmission request and a second identification of one or more first data packets that are lost; whether the packet-retransmission request is processed is determined based on at least information associated with the first identification; in response to the packet-retransmission request not being processed, the one or more first data packets are obtained based on at least information associated with the second identification and the one or more first data packets are sent to the data-reception terminal.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
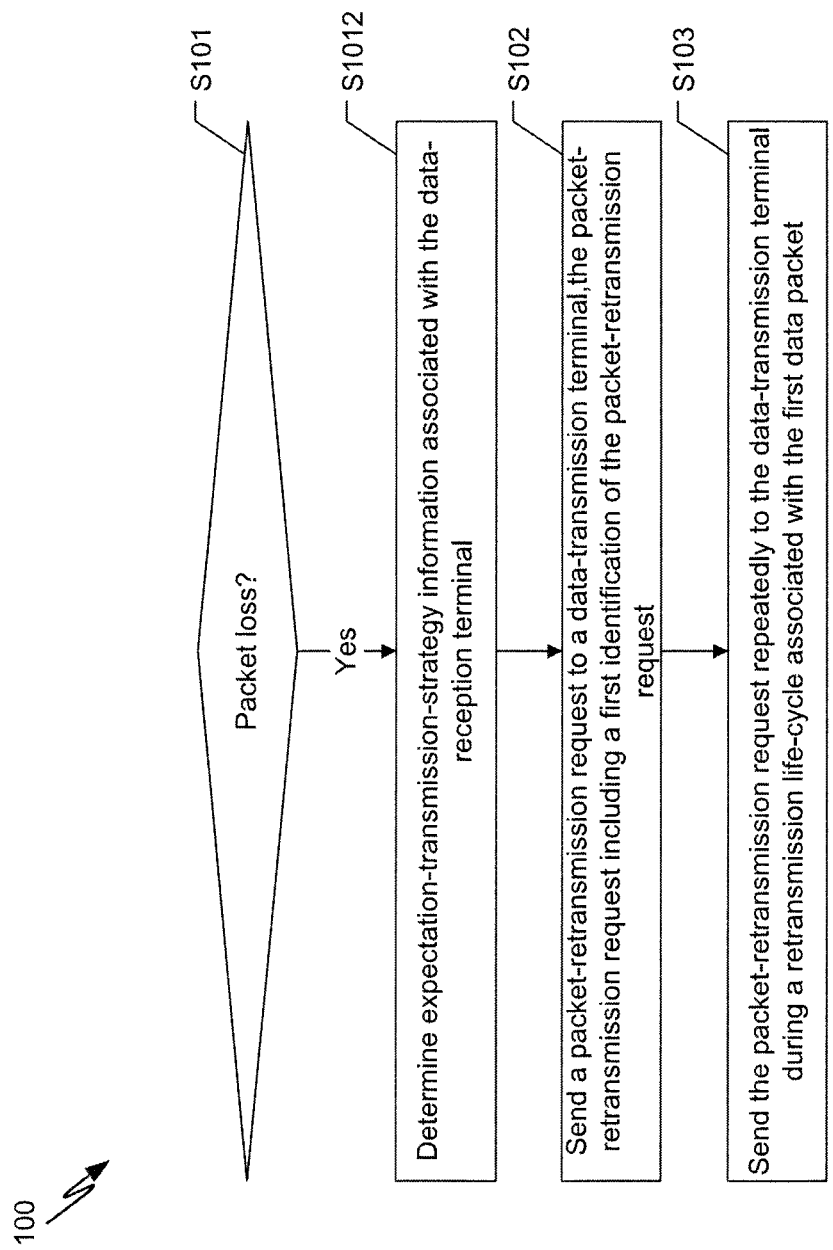
FIG. 1 is a simplified diagram showing a method for data transmission according to one embodiment of the present invention.

FIG. 1 is a simplified diagram showing a method for data transmission according to one embodiment of the present invention. This diagram is merely an example, which should not unduly limit the scope of the claims. One of ordinary skill in the art would recognize many variations, alternatives, and modifications. The method 100 includes at least the processes S101-S103.

According to one embodiment, the process S101 includes: detecting whether there is packet loss. For example, if there is packet loss, then the process S102 is executed. In another example, the process S102 includes: sending a packet-retransmission request to a data-transmission terminal. As an example, the packet-retransmission request includes a first identification of the packet-retransmission request. As another example, the process S103 includes: repeatedly sending the packet-retransmission request to the data-transmission terminal during a retransmission life-cycle of the current data packet.

In some embodiments, when a packet loss is detected, the packet-retransmission request, which includes the first identification of the packet-retransmission request, is sent by a data-reception terminal to the data-transmission terminal. For example, the packet-retransmission request is sent repeatedly to the data-transmission terminal within the retransmission life-cycle of the current data packet. Consequently, even if multiple packet-retransmission requests are sent to the data-transmission terminal, the data-transmission terminal can process and respond only once to the multiple packet-retransmission requests with the same first identification, so that the data-transmission terminal is prevented from responding repeatedly with respect to same lost data packets. Thus, repeated retransmissions of the lost data packets may be avoided, and the bandwidth taken up by the repeated retransmissions of the lost data packets may be reduced so that the performance of data transmission and packet retransmission can be improved, in some embodiments.

In certain embodiments, in a real-time data transmission process, such as an online video chat or an online voice chat, data packets are generally time sensitive to ensure smooth and continuous playback. For example, if a data packet is obtained and played after a playback point associated with the data packet has passed, the playback may not be smooth. The repeated transmissions of the packet-retransmission request within the retransmission life-cycle of the current data packet may prevent repeated packet retransmissions and ameliorate bandwidth occupancy issues due to inappropriate time intervals between repeated transmissions of the packet-retransmission request so as to enhance and optimize the performance of packet retransmission, in certain embodiments.

In one embodiment, a received packet is stored in a packet-storage circular buffer and a packet sequence number associated with the received packet is output. For example, the detection of packet loss is performed based on the packet sequence number of the received data packet. In another example, the process S101 includes: determining whether the packet sequence number is in sequence with the packet sequence number associated with a most recently received data packet; if these packet sequence numbers are in sequence, determining that there is no packet loss; if these packet sequence numbers are not in sequence, determining that there is packet loss and providing one or more sequence numbers of one or more lost data packets to a lost-data-packet-sequence-number circular buffer. As an example, since the data packets are distinguished based on their sequence numbers, the packet-retransmission request includes the sequence number(s) of the lost data packet(s).

In another embodiment, the method 100 further includes the process S1012. For example, during the process S1012, expectation-transmission-strategy information associated with the data-reception terminal is determined. As an example, the packet-retransmission request includes the expectation-transmission-strategy information associated with the data-reception terminal, so as to provide the expected transmission strategy of the data-reception terminal to the data-transmission terminal for reference and determination of specific transmission manners. In another example, the expected transmission strategy of the data-reception terminal is determined based on at least information associated with a current packet loss rate and a network traffic and a traffic threshold of the data-reception terminal, etc. In yet another example, the expectation-transmission-strategy information associated with the data-reception terminal includes: double packet transmission (e.g., upon detection of a number of consecutive lost data packets, such as 3 lost data packets, 5 lost data packets, etc.), intermittent packet transmission, increased FEC (Forward Error Correction), redundant packet transmission, etc. In yet another example, a specific protocol format of a packet-retransmission request includes: the sequence number(s) of the lost data packet(s), a first identification of the packet-retransmission request and the expectation-transmission-strategy information associated with the data-reception terminal. For example, the first identification is represented by a request sequence number of the packet-retransmission request.

In yet another embodiment, the retransmission life-cycle of the current data packet is determined based on actual needs. For example, the retransmission life-cycle of the current data packet can be determined based on a duration associated with one of more data packets in a jitter buffer and a playback buffer. In another example, the data-reception terminal configures the retransmission life-cycle of the current data packet based on the actual playback status, as long as the current data packet can be played after obtaining retransmitted data packets so as to meet the requirements of continuous playback. In yet another example, a sum of the durations of the data packets in the jitter buffer and in the playback buffer is used directly as the retransmission life-cycle of the current data packet.

In yet another embodiment, the retransmission life-cycle of the current data packet is determined based on a round-trip delay between the data-transmission terminal and the data-reception terminal and a time interval between successive data packets sent by the data-transmission terminal. For example, the data-transmission terminal sends data packets to the data-reception terminal based on regular time intervals. As an example, the data-reception terminal is informed of the time intervals by the data-transmission terminal. As another example, the time intervals are set at the data-reception terminal based on the settings of the data-transmission terminal.

In yet another embodiment, the round-trip delay is determined based on a delay of transmitting a data packet between the data-transmission terminal and the data-reception terminal. For example, the round-trip delay is determined based on transmission of a test packet specifically for measuring the round-trip delay to avoid the negative effects of some large common data packets on the round-trip delay. As an example, the round-trip delay is determined based on at least information associated with a time difference between a first time at which the data-transmission terminal sends a RTT packet to the data-reception terminal for testing the round-trip delay and a second time at which the data-transmission terminal receives a RTT response packet sent by the data-reception terminal in response to the RTT packet. As another example, the data-transmission terminal sends the RTT packets at regular intervals, in order to obtain the round-trip delay in real time. As yet another example, a current RTT packet includes the time difference obtained from a previous RTT packet, so as to inform the data-reception terminal of the time difference, so that the data-reception terminal determines the round-trip delay based on the time difference. For example, the size of the RTT packet is within a certain range to reduce the impact of the traffic associated with the RTT packets on the transmission time and meet the real-time feedback requirements of the data-reception terminal. In another example, the time difference between the first time at which the data-transmission terminal sends the RTT packet and the second at which the data-transmission terminal receives the RTT response packet is directly used as the round-trip delay. In yet another example, the round-trip delay is determined based on multiple time differences measured within a predetermined time period so that the determined round-trip delay reflects the current actual network conditions and takes into consideration the impact of network jitters. In yet another example, the round-trip delay is an average value of two or more time differences measured within the predetermined time period. In yet another example, the round-trip delay is determined by conducting a weighted average calculation or other computations on two or more time differences measured within the predetermined time period.

According to some embodiments, in order to reduce the number of packets transmitted over the network, the data-reception terminal combines the RTT response packet and the packet-retransmission request into a data packet and sends the combined data packet to the data-reception terminal. For example, the RTT response packet is incorporated into the packet-retransmission packet, and the transmission time of the retransmission request is related to the measurement of the above-noted time differences. The RTT response packet is merged with other types of data packets without increasing the processing capacity of the data-transmission terminal, in certain embodiments.

Figure 2:
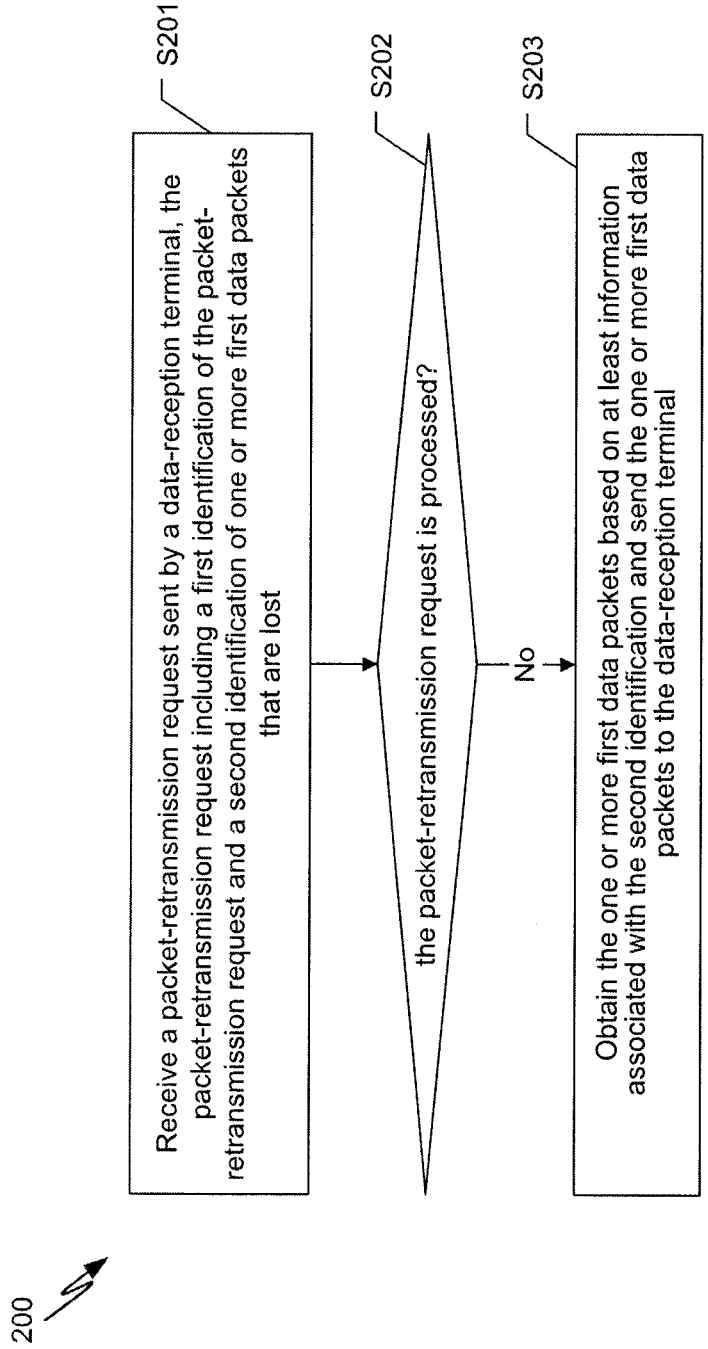
FIG. 2 is a simplified diagram showing a method for data transmission according to another embodiment of the present invention.

FIG. 2 is a simplified diagram showing a method for data transmission according to another embodiment of the present invention. This diagram is merely an example, which should not unduly limit the scope of the claims. One of ordinary skill in the art would recognize many variations, alternatives, and modifications. The method 200 includes at least the processes S201-S203.

According to one embodiment, the process S201 includes: receiving a packet-retransmission request sent by the data-reception terminal, the packet-retransmission request including a first identification of the packet-retransmission request and a second identification of one or more lost data packets. For example, the process S202 includes: determining whether the packet-retransmission request is processed based on the first identification. As an example, if the packet-retransmission request has been processed, the packet-retransmission request does not need to be processed. Otherwise, the process Step S203 is executed. As another example, the process Step S203 includes: obtaining the lost data packets corresponding to the second identification and sending the lost data packets to the data-reception terminal. In one example, the packet-retransmission request sent by the data-reception terminal to the data-transmission terminal includes the first identification of the packet-retransmission request. In another example, after receiving the packet-retransmission request, the data-transmission terminal can process and respond only once to multiple packet-retransmission requests with a same first identification, so that the data-transmission terminal is prevented from responding repeatedly with respect to same lost data packets. Thus, repeated retransmissions of the lost data packets may be avoided, and the bandwidth taken up by the repeated retransmissions of the lost data packets may be reduced so that the performance of data transmission and packet retransmission can be improved, in some embodiments. For example, the data-reception terminal can determine whether there is packet loss based on the sequence number of a received data packet, and the sequence numbers of the lost data packets can be included in the packet-retransmission request if it is determined that there is packet loss. As an example, the second identification of the lost data packets includes the sequence numbers of the lost data packets.

According to another embodiment, to determine whether the packet-retransmission request is processed based on the first identification, a responded-retransmission-request circular buffer is configured in advance to store identification information of those packet-retransmission requests that have been processed. For example, the process S202 includes: searching for the first identification in a responded-retransmission-request circular buffer; in response to the first identification being in the responded-retransmission-request circular buffer, determining the packet-retransmission request is processed; and in response to the first identification not being in the responded-retransmission-request circular buffer, determining the packet-retransmission request is not processed. As an example, if the packet-retransmission request is not processed, the lost data packets corresponding to the second identification. In one example, the lost data packets can be obtained from the packet-storage circular buffer and sent to the data-reception terminal. In another example, after the lost data packet is sent to the data-reception terminal, the first identification can be added to the circular buffer of responded retransmission requests to facilitate processing a next packet-retransmission request.

According to yet another embodiment, the packet-retransmission request includes the expectation-transmission-strategy information associated with the data-reception terminal, so as to provide the expected transmission strategy of the data-reception terminal to the data-transmission terminal for reference and determination of specific transmission manners. As an example, the expected transmission strategy of the data-reception terminal is determined based on at least information associated with a current packet loss rate and a network traffic and a traffic threshold of the data-reception terminal, etc. In another example, the expectation-transmission-strategy information associated with the data-reception terminal includes: double packet transmission (e.g., upon detection of a number of consecutive lost data packets, such as 3 lost data packets, 5 lost data packets, etc.), intermittent packet transmission, increased FEC (Forward Error Correction), redundant packet transmission, etc.

According to yet another embodiment, after receiving the packet-retransmission request, the data-transmission terminal can determine specific manners for sending the lost data packets to the data-reception terminal based on the actual situations of the data-transmission terminal and the expectation-transmission-strategy information associated with the data-reception terminal contained in the packet-retransmission request. For example, a data-packet-transmission strategy is determined based on the expectation-transmission-strategy information associated with the data-reception terminal and the current round-trip delay. In another example, the lost data packets are sent to the data-reception terminal based on the data-packet-transmission strategy. In yet another example, a specific data-packet-transmission strategy is determined by combining the current traffic of the data-transmission terminal, a currently-set traffic threshold and a delay jitter. In yet another example, the data-packet-transmission strategy determined by the data-transmission terminal includes: double packet transmission, FEC (15% data redundancy), FEC (redundancy parameter N).

In one embodiment, the round-trip delay is determined based on a delay of transmitting a data packet between the data-transmission terminal and the data-reception terminal. For example, the round-trip delay is determined based on transmission of a test packet specifically for measuring the round-trip delay to avoid the negative effects of some large common data packets on the round-trip delay. As an example, the round-trip delay is determined based on at least information associated with a time difference between a first time at which the data-transmission terminal sends a RTT packet to the data-reception terminal for testing the round-trip delay and a second time at which the data-transmission terminal receives a RTT response packet sent by the data-reception terminal in response to the RTT packet. As another example, the data-transmission terminal sends the RTT packets at regular intervals, in order to obtain the round-trip delay in real time. As yet another example, a current RTT packet includes the time difference obtained from a previous RTT packet, so as to inform the data-reception terminal of the time difference, so that the data-reception terminal determines the round-trip delay based on the time difference. For example, the size of the RTT packet is within a certain range to reduce the impact of the traffic associated with the RTT packets on the transmission time and meet the real-time feedback requirements of the data-reception terminal. In another example, the time difference between the first time at which the data-transmission terminal sends the RTT packet and the second at which the data-transmission terminal receives the RTT response packet is directly used as the round-trip delay. In yet another example, the round-trip delay is determined based on multiple time differences measured within a predetermined time period so that the determined round-trip delay reflects the current actual network conditions and takes into consideration the impact of network jitters. In yet another example, the round-trip delay is an average value of two or more time differences measured within the predetermined time period. In yet another example, the round-trip delay is determined by conducting a weighted average calculation or other computations on two or more time differences measured within the predetermined time period.

In another embodiment, a transmission traffic of the data-transmission terminal is determined. For example, the transmission traffic of the data-transmission terminal includes a current traffic and a current average traffic within a first predetermined time period. In another example, the current traffic includes a first traffic of data packets, a second traffic of RTT packets and a third traffic of RTT response packets during a second predetermined time period. In yet another example, the current average traffic includes an average of a fourth traffic of data packets, a fifth traffic of RTT packets and a sixth traffic of RTT response packets during the first predetermined time period, the first predetermined time period being longer than the second predetermined time period. In yet another example, the data-packet-transmission strategy is determined based on at least information associated with the transmission traffic of the data-transmission terminal. As an example, the data-packet-transmission strategy is determined based on at least information associated with the expectation-transmission-strategy information associated with the data-reception terminal, the transmission traffic of the data-transmission terminal, a predetermined traffic threshold and a delay jitter of the current round-trip delay.

Figure 3:
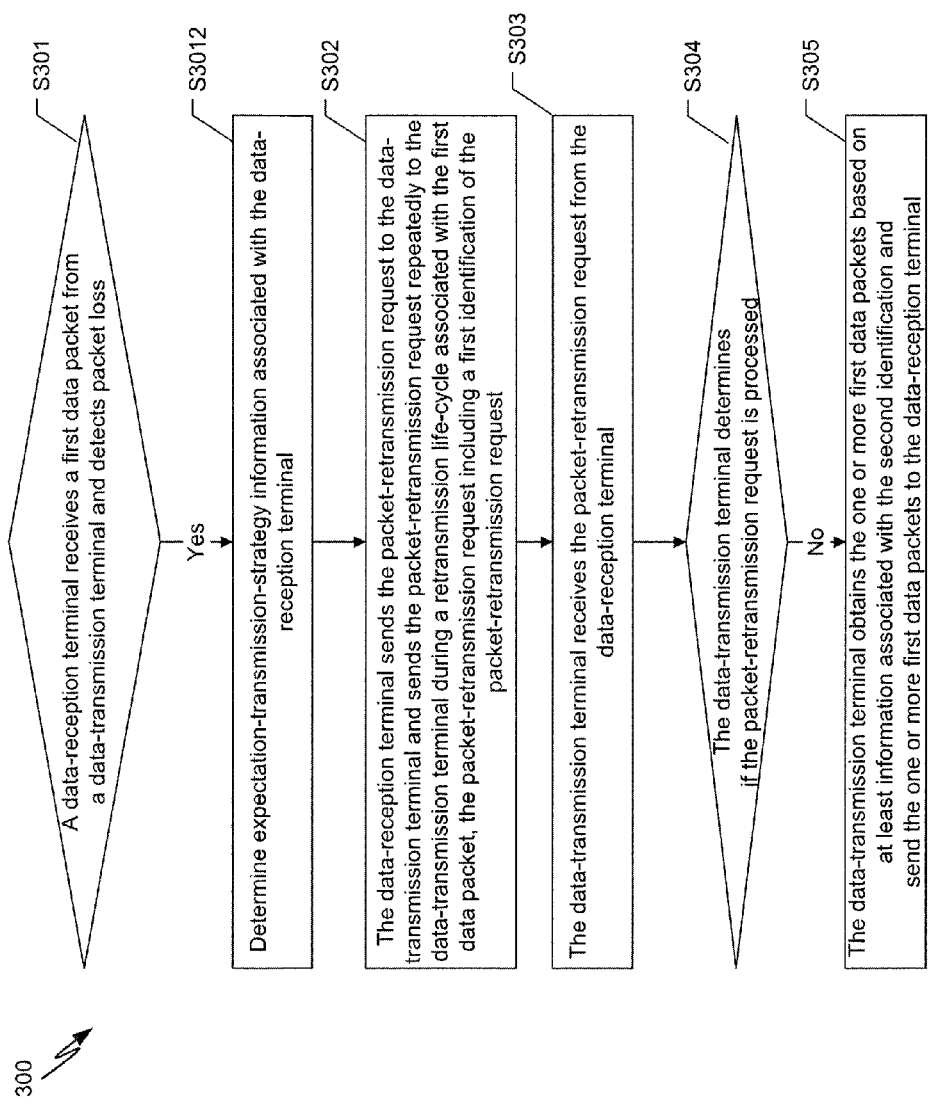
FIG. 3 is a simplified diagram showing a method for data transmission according to yet embodiment of the present invention.

FIG. 3 is a simplified diagram showing a method for data transmission according to yet another embodiment of the present invention. This diagram is merely an example, which should not unduly limit the scope of the claims. One of ordinary skill in the art would recognize many variations, alternatives, and modifications. The method 300 includes at least the processes S301-S305.

According to one embodiment, during the process S301, the data-reception terminal receives a data packet sent by the data-transmission terminal and detects for packet loss based on the received data packet. For example, if there is packet loss, the process S302 is executed. In another example, during the process S302, the data-reception terminal sends a packet-retransmission request to the data-transmission terminal. In yet another example, the packet-retransmission request includes a first identification of the packet-retransmission request and a second identification of the lost data packet(s). In yet another example, the packet-retransmission request is sent repeatedly to the data-transmission terminal during a retransmission life-cycle of the current data packet. In yet another example, during the process S303, the data-transmission terminal receives the packet-retransmission request sent by the data-reception terminal. In yet another example, during the process S304, the data-transmission terminal determines whether the packet-retransmission request is processed based on the first identification. In yet another example, if the packet-retransmission request has been processed, the packet-retransmission request does not need to be processed. Otherwise, the process Step S305 is executed.

According to another embodiment, during the process Step S305, the data-transmission terminal obtains the lost data packet(s) corresponding to the second identification and sends the lost data packet(s) to the data-reception terminal. For example, when the data-reception terminal detects there is packet loss, a packet-retransmission request that includes the first identification of the packet-retransmission request is sent to the data-transmission terminal. In another example, the data-reception terminal sends repeatedly the packet-retransmission request to the data-transmission terminal during a retransmission life-cycle of the current data packet. In yet another example, after receiving the packet-retransmission request, the data-transmission terminal can process and respond only once to multiple packet-retransmission requests with the same first identification so that the data-transmission terminal is prevented from responding repeatedly with respect to same lost data packets. Thus, repeated retransmissions of the lost data packets may be avoided, and the bandwidth taken up by the repeated retransmissions of the lost data packets may be reduced so that the performance of data transmission and packet retransmission can be improved, in some embodiments.

In certain embodiments, in a real-time data transmission process, such as an online video chat or an online voice chat, data packets are generally time sensitive to ensure smooth and continuous playback. For example, if a data packet is obtained and played after a playback point associated with the data packet has passed, the playback may not be smooth. The repeated transmissions of the packet-retransmission request within the retransmission life-cycle of the current data packet may prevent repeated packet retransmissions and ameliorate bandwidth occupancy issues due to inappropriate time intervals between repeated transmissions of the packet-retransmission request so as to enhance and optimize the performance of packet retransmission, in certain embodiments.

In certain embodiments, in a real-time data transmission process, such as an online video chat or an online voice chat, data packets are generally time sensitive, so a device/system can be configured to implement the method 100 to ensure smooth and continuous playback. For example, if a data packet is obtained and played after a playback point associated with the data packet has passed, the playback may not be smooth. The repeated transmissions of the packet-retransmission request within the retransmission life-cycle of the current data packet may prevent repeated packet retransmissions and ameliorate bandwidth occupancy issues due to inappropriate time intervals between repeated transmissions of the packet-retransmission request so as to enhance and optimize the performance of packet retransmission, in certain embodiments.

In one embodiment, a received packet is stored in a packet-storage circular buffer and a packet sequence number associated with the received packet is output. For example, the detection of packet loss is performed based on the packet sequence number of the received data packet. In another example, the process S101 includes: determining whether the packet sequence number is in sequence with the packet sequence number associated with a most recently received data packet; if these packet sequence numbers are in sequence, determining that there is no packet loss; if these packet sequence numbers are not in sequence, determining that there is packet loss and providing one or more sequence numbers of one or more lost data packets to a lost-data-packet-sequence-number circular buffer. As an example, since the data packets are distinguished based on their sequence numbers, the packet-retransmission request includes the sequence number(s) of the lost data packet(s).

In another embodiment, the method 300 further includes the process S3012. For example, during the process S3012, expectation-transmission-strategy information associated with the data-reception terminal is determined. As an example, the packet-retransmission request includes the expectation-transmission-strategy information associated with the data-reception terminal, so as to provide the expected transmission strategy of the data-reception terminal to the data-transmission terminal for reference and determination of specific transmission manners. In another example, the expected transmission strategy of the data-reception terminal is determined based on at least information associated with a current packet loss rate and a network traffic and a traffic threshold of the data-reception terminal, etc. In yet another example, the expectation-transmission-strategy information associated with the data-reception terminal includes: double packet transmission (e.g., upon detection of a number of consecutive lost data packets, such as 3 lost data packets, 5 lost data packets, etc.), intermittent packet transmission, increased FEC (Forward Error Correction), redundant packet transmission, etc. In yet another example, a specific protocol format of a packet-retransmission request includes: the sequence number(s) of the lost data packet(s), a first identification of the packet-retransmission request and the expectation-transmission-strategy information associated with the data-reception terminal. For example, the first identification is represented by a request sequence number of the packet-retransmission request.

In yet another embodiment, the process S304 includes: searching for the first identification in a responded-retransmission-request circular buffer; in response to the first identification being in the responded-retransmission-request circular buffer, determining the packet-retransmission request is processed; and in response to the first identification not being in the responded-retransmission-request circular buffer, determining the packet-retransmission request is not processed. As an example, if the packet-retransmission request is not processed, the lost data packets corresponding to the second identification. In one example, the lost data packets can be obtained from the packet-storage circular buffer and sent to the data-reception terminal. In another example, after the lost data packet is sent to the data-reception terminal, the first identification can be added to the circular buffer of responded retransmission requests to facilitate processing a next packet-retransmission request.

In yet another embodiment, after receiving the packet-retransmission request, the data-transmission terminal can determine specific manners for sending the lost data packets to the data-reception terminal based on the actual situations of the data-transmission terminal and the expectation-transmission-strategy information associated with the data-reception terminal contained in the packet-retransmission request. For example, a data-packet-transmission strategy is determined based on the expectation-transmission-strategy information associated with the data-reception terminal and the current round-trip delay. In another example, the lost data packets are sent to the data-reception terminal based on the data-packet-transmission strategy. In yet another example, a specific data-packet-transmission strategy is determined by combining the current traffic of the data-transmission terminal, a currently-set traffic threshold and a delay jitter. In yet another example, the data-packet-transmission strategy determined by the data-transmission terminal includes: double packet transmission, FEC (15% data redundancy), FEC (redundancy parameter N).

In yet another embodiment, the retransmission life-cycle of the current data packet is determined based on actual needs. For example, the retransmission life-cycle of the current data packet can be determined based on a duration associated with one of more data packets in a jitter buffer and a playback buffer. In another example, the data-reception terminal configures the retransmission life-cycle of the current data packet based on the actual playback status, as long as the current data packet can be played after obtaining retransmitted data packets so as to meet the requirements of continuous playback. In yet another example, a sum of the durations of the data packets in the jitter buffer and in the playback buffer is used directly as the retransmission life-cycle of the current data packet.

In yet another embodiment, the retransmission life-cycle of the current data packet is determined based on a round-trip delay between the data-transmission terminal and the data-reception terminal and a time interval between successive data packets sent by the data-transmission terminal. For example, the data-transmission terminal sends data packets to the data-reception terminal based on regular time intervals. As an example, the data-reception terminal is informed of the time intervals by the data-transmission terminal. As another example, the time intervals are set at the data-reception terminal based on the settings of the data-transmission terminal.

In yet another embodiment, the round-trip delay is determined based on a delay of transmitting a data packet between the data-transmission terminal and the data-reception terminal. For example, the round-trip delay is determined based on transmission of a test packet specifically for measuring the round-trip delay to avoid the negative effects of some large common data packets on the round-trip delay. As an example, the round-trip delay is determined based on at least information associated with a time difference between a first time at which the data-transmission terminal sends a RTT packet to the data-reception terminal for testing the round-trip delay and a second time at which the data-transmission terminal receives a RTT response packet sent by the data-reception terminal in response to the RTT packet. As another example, the data-transmission terminal sends the RTT packets at regular intervals, in order to obtain the round-trip delay in real time. As yet another example, a current RTT packet includes the time difference obtained from a previous RTT packet, so as to inform the data-reception terminal of the time difference, so that the data-reception terminal determines the round-trip delay based on the time difference. For example, the size of the RTT packet is within a certain range to reduce the impact of the traffic associated with the RTT packets on the transmission time and meet the real-time feedback requirements of the data-reception terminal. In another example, the time difference between the first time at which the data-transmission terminal sends the RTT packet and the second at which the data-transmission terminal receives the RTT response packet is directly used as the round-trip delay. In yet another example, the round-trip delay is determined based on multiple time differences measured within a predetermined time period so that the determined round-trip delay reflects the current actual network conditions and takes into consideration the impact of network jitters. In yet another example, the round-trip delay is an average value of two or more time differences measured within the predetermined time period. In yet another example, the round-trip delay is determined by conducting a weighted average calculation or other computations on two or more time differences measured within the predetermined time period.

According to some embodiments, in order to reduce the number of packets transmitted over the network, the data-reception terminal combines the RTT response packet and the packet-retransmission request into a data packet and sends the combined data packet to the data-reception terminal. For example, the RTT response packet is incorporated into the packet-retransmission packet, and the transmission time of the retransmission request is related to the measurement of the above-noted time differences. The RTT response packet is merged with other types of data packets without increasing the processing capacity of the data-transmission terminal, in certain embodiments.

In another embodiment, a transmission traffic of the data-transmission terminal is determined. For example, the transmission traffic of the data-transmission terminal includes a current traffic and a current average traffic within a first predetermined time period. In another example, the current traffic includes a first traffic of data packets, a second traffic of RTT packets and a third traffic of RTT response packets during a second predetermined time period. In yet another example, the current average traffic includes an average of a fourth traffic of data packets, a fifth traffic of RTT packets and a sixth traffic of RTT response packets during the first predetermined time period, the first predetermined time period being longer than the second predetermined time period. In yet another example, the data-packet-transmission strategy is determined based on at least information associated with the transmission traffic of the data-transmission terminal. As an example, the data-packet-transmission strategy is determined based on at least information associated with the expectation-transmission-strategy information associated with the data-reception terminal, the transmission traffic of the data-transmission terminal, a predetermined traffic threshold and a delay jitter of the current round-trip delay.

Figure 4:
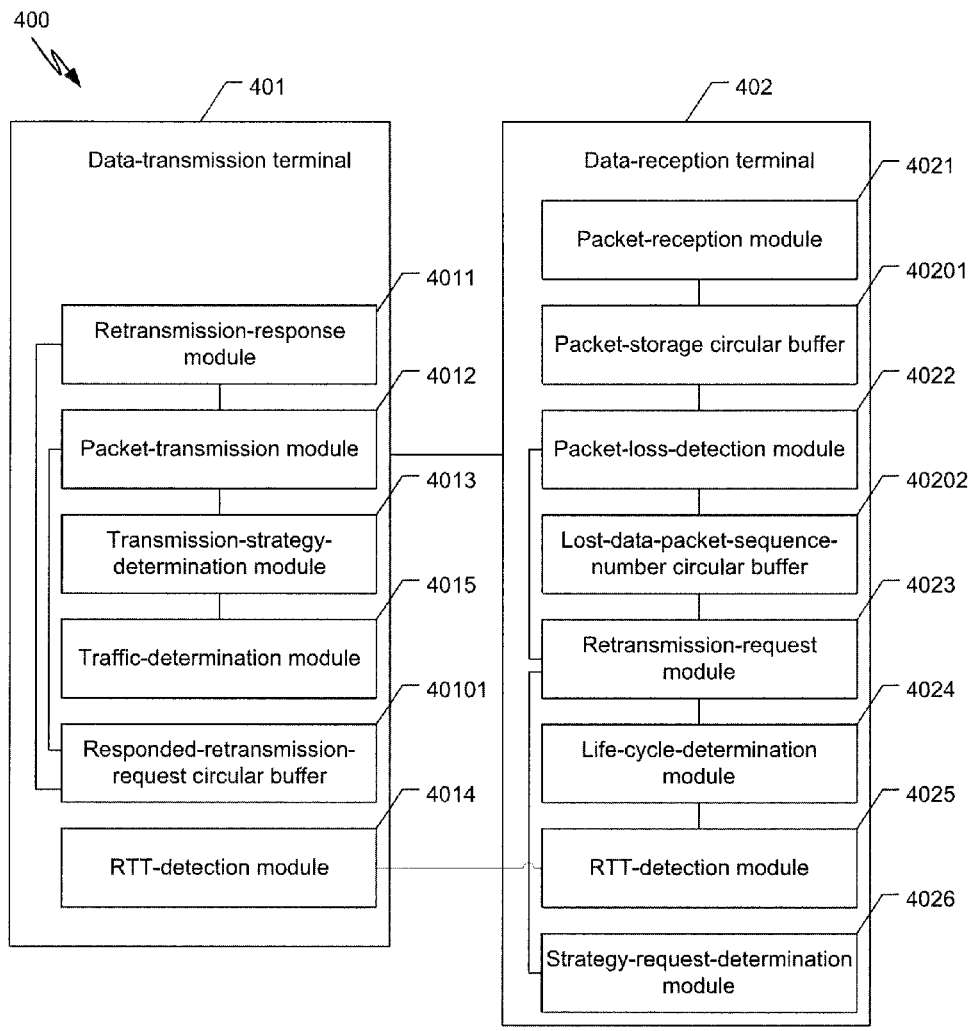
FIG. 4 is a simplified diagram showing a system for data transmission according to one embodiment of the present invention.

FIG. 4 is a simplified diagram showing a system for data transmission according to one embodiment of the present invention. This diagram is merely an example, which should not unduly limit the scope of the claims. One of ordinary skill in the art would recognize many variations, alternatives, and modifications. The system 400 includes a data-transmission terminal 401 and a data-reception terminal 402.

According to one embodiment, the data-reception terminal 402 includes: a packet-reception module 4021 configured to receive a first packet sent by the data-transmission terminal 401, a packet-loss-detection module 4022 configured to detect whether there is packet loss based on the first packet received by the packet-reception module 4021, a life-cycle-determination module 4024 configured to determine a retransmission life-cycle associated with the first data packet, and a retransmission-request module 4023 configured to send a packet-retransmission request to the data-transmission terminal 401 upon detection of any packet loss by the packet-loss-detection module 4022 and repeatedly send the packet-retransmission request to the data-transmission terminal 401 during the retransmission life-cycle of the first data packet. For example, the packet-retransmission request includes a first identification of the packet-retransmission request and a second identification of lost data packet(s).

According to another embodiment, the data-transmission terminal 401 includes: a retransmission-response module 4011 configured to receive the packet-retransmission request sent by the data-reception terminal 402. For example, the packet-retransmission request includes the first identification of the packet-retransmission request and the second identification of the lost packet(s). As an example, the retransmission-response module 4011 is further configured to determine whether the packet-retransmission request is processed based on the first identification. In another example, the data-transmission terminal 401 includes a packet-transmission module 4012 configured to obtain the lost data packet(s) corresponding to the second identification and send the lost data packet(s) to the data-reception terminal 402 in response to the retransmission-response module 4011 determining that the packet-retransmission request has not been processed.

For example, when the data-reception terminal 402 detects there is packet loss, a packet-retransmission request that includes the first identification of the packet-retransmission request is sent to the data-transmission terminal 401. In another example, the data-reception terminal 402 sends repeatedly the packet-retransmission request to the data-transmission terminal 401 during a retransmission life-cycle of the current data packet. In yet another example, after receiving the packet-retransmission request, the data-transmission terminal 401 can process and respond only once to multiple packet-retransmission requests with the same first identification so that the data-transmission terminal 401 is prevented from responding repeatedly with respect to same lost data packets. Thus, repeated retransmissions of the lost data packets may be avoided, and the bandwidth taken up by the repeated retransmissions of the lost data packets may be reduced so that the performance of data transmission and packet retransmission can be improved, in some embodiments.

In certain embodiments, in a real-time data transmission process, such as an online video chat or an online voice chat, data packets are generally time sensitive to ensure smooth and continuous playback. For example, if a data packet is obtained and played after a playback point associated with the data packet has passed, the playback may not be smooth. The repeated transmissions of the packet-retransmission request within the retransmission life-cycle of the current data packet may prevent repeated packet retransmissions and ameliorate bandwidth occupancy issues due to inappropriate time intervals between repeated transmissions of the packet-retransmission request so as to enhance and optimize the performance of packet retransmission, in certain embodiments.

In one embodiment, the data-reception terminal 402 includes a package-storage circular buffer 40201 and a lost-data-packet-sequence-number circular buffer 40202. For example, the data-transmission terminal 401 includes a responded-retransmission-request circular buffer 40101. In another example, the packet-storage circular buffer 40201 is configured to store data packets received by the packet-reception module 4021. The specific length of the packet-storage circular buffer 40201 is set based on predetermined values associated with the data-reception terminal 402 and a value related to a jitter buffer. In yet another example, the jitter buffer can also be directly used as the packet-storage circular buffer 40201 for storing playback data packets.

In another embodiment, the lost-data-packet-sequence-number circular buffer 40202 is configured to store information related to the lost data packet(s), e.g., the sequence number(s) of the lost data packet(s). For example, the lost-data-packet-sequence-number circular buffer 40202 is further configured to store information related to the retransmission request associated with the lost data packet(s), e.g., the sending time(s) and the sending frequency of the packet-retransmission request for the lost data packet(s). In another example, the responded-retransmission-request circular buffer 40101 is configured to store identification information of the packet-retransmission requests that have been responded, where the identification information includes the request sequence numbers of the packet-retransmission requests.

In yet another embodiment, after the packet-reception module 4021 receives the first packet, the first packet can be stored in the packet-storage circular buffer 40201 and the packet sequence number is output. As an example, the packet-storage circular buffer 4022 can determine whether there is packet loss based on the sequence number of the first data packet. For example, the packet-loss-detection module 4022 is further configured to: determine whether the packet sequence number is in sequence with the packet sequence number associated with a most recently received data packet; if these packet sequence numbers are in sequence, determine that there is no packet loss; if these packet sequence numbers are not in sequence, determine that there is packet loss and providing one or more sequence numbers of one or more lost data packets to the lost-data-packet-sequence-number circular buffer 40202. As an example, since the data packets are distinguished based on their sequence numbers, the packet-retransmission request includes the sequence number(s) of the lost data packet(s).

In some embodiments, after receiving the packet-retransmission request, the retransmission-response module 4011 compares the first identification of the packet-retransmission request received with identifications stored in the responded-retransmission-request circular buffer 40101. For example, if the first identification is found in the responded-retransmission-request circular buffer 40101, it indicates that a response has been provided for the packet-retransmission request and there is no need to respond again to the packet-retransmission request. In another example, if the first identification is not found in the responded-retransmission-request circular buffer 40101, the packet-retransmission request is responded to. For example, the lost data packet(s) corresponding to the second identification is obtained and sent to the data-reception terminal 402. Thereafter, the first identification of the packet-retransmission request is provided (e.g., cached) in the responded-retransmission-request circular buffer 40101 to facilitate processing a next packet-retransmission request.

In some embodiments, the data-reception terminal 402 also includes: a strategy-request-determination module 4026 configured to determine expectation-transmission-strategy information associated with the data-reception terminal. For example, the packet-retransmission request can also include the expectation-transmission-strategy information associated with the data-reception terminal, so as to provide the expected transmission strategy of the data-reception terminal 402 to the data-transmission terminal 401 for reference and identification of specific transmission manners. As an example, the expected transmission strategy of the data-reception terminal 402 can be determined based on at least information associated with a current packet loss rate and a network traffic and a traffic threshold of the data-reception terminal, etc.

In certain embodiments, the data-transmission terminal 401 can also include a transmission-strategy-determination module 4013 configured to determine the data-packet-transmission strategy based on the expectation-transmission-strategy information associated with the data-reception terminal and the current round-trip delay. For example, the packet-reception module 4012 sends the lost data packet to the data-reception terminal based on the data-packet-transmission strategy determined by the transmission-strategy-determination module 4013. In another example, the data-reception terminal 402 informs the data-transmission terminal 401 of the expected transmission strategy. In yet another example, after receiving the packet-retransmission request, the data-transmission terminal 401 determine specific manners for sending the lost data packets to the data-reception terminal 402 based on the actual situations of the data-transmission terminal 401 and the expectation-transmission-strategy information associated with the data-reception terminal 402 contained in the packet-retransmission request. In yet another example, the expectation-transmission-strategy information associated with the data-reception terminal includes: double packet transmission (e.g., upon detection of a number of consecutive lost data packets, such as 3 lost data packets, 5 lost data packets, etc.), intermittent packet transmission, increased FEC (Forward Error Correction), redundant packet transmission, etc. In yet another example, a specific protocol format of a packet-retransmission request includes: the sequence number(s) of the lost data packet(s), a first identification of the packet-retransmission request and the expectation-transmission-strategy information associated with the data-reception terminal. For example, the first identification is represented by a request sequence number of the packet-retransmission request.

In yet another embodiment, after receiving the packet-retransmission request, the data-transmission terminal 401 can determine specific manners for sending the lost data packets to the data-reception terminal 402 based on the actual situations of the data-transmission terminal 401 and the expectation-transmission-strategy information associated with the data-reception terminal 402 contained in the packet-retransmission request. For example, a data-packet-transmission strategy is determined based on the expectation-transmission-strategy information associated with the data-reception terminal and the current round-trip delay. In another example, the lost data packets are sent to the data-reception terminal based on the data-packet-transmission strategy. In yet another example, a specific data-packet-transmission strategy is determined by combining the current traffic of the data-transmission terminal, a currently-set traffic threshold and a delay jitter. In yet another example, the data-packet-transmission strategy determined by the data-transmission terminal includes: double packet transmission, FEC (15% data redundancy), FEC (redundancy parameter N).

In yet another embodiment, the retransmission life-cycle of the current data packet is determined based on actual needs. For example, the retransmission life-cycle of the current data packet can be determined based on a duration associated with one of more data packets in a jitter buffer and a playback buffer. In another example, the data-reception terminal configures the retransmission life-cycle of the current data packet based on the actual playback status, as long as the current data packet can be played after obtaining retransmitted data packets so as to meet the requirements of continuous playback. In yet another example, a sum of the durations of the data packets in the jitter buffer and in the playback buffer is used directly as the retransmission life-cycle of the current data packet.

In yet another embodiment, the retransmission life-cycle of the current data packet is determined based on a round-trip delay between the data-transmission terminal and the data-reception terminal and a time interval between successive data packets sent by the data-transmission terminal. For example, the data-transmission terminal sends data packets to the data-reception terminal based on regular time intervals. As an example, the data-reception terminal is informed of the time intervals by the data-transmission terminal. As another example, the time intervals are set at the data-reception terminal based on the settings of the data-transmission terminal.

In yet another embodiment, the round-trip delay is determined based on a delay of transmitting a data packet between the data-transmission terminal and the data-reception terminal. For example, the round-trip delay is determined based on transmission of a test packet specifically for measuring the round-trip delay to avoid the negative effects of some large common data packets on the round-trip delay. As an example, the round-trip delay is determined based on at least information associated with a time difference between a first time at which the data-transmission terminal sends a RTT packet to the data-reception terminal for testing the round-trip delay and a second time at which the data-transmission terminal receives a RTT response packet sent by the data-reception terminal in response to the RTT packet.

According to one embodiment, the data-transmission terminal 401 includes a RTT-detection module 4014, and a data-reception terminal 402 includes a RTT-detection module 4025. For example, the RTT-detection module 4014 is configured to send RTT packets to the data-reception terminal 402 for round-trip delay testing, receive the RTT response packet sent by the data-reception terminal 402 in response to the RTT packet and determine the time difference between the sending time of the RTT packet and the receiving time of the RTT response packet. In another example, the RTT-detection module 4025 is configured to receive RTT packets sent by the data-transmission terminal

401 for round-trip testing and to send the RTT response packet in response to the RTT packet sent by the data-transmission terminal 401.

As another example, the data-transmission terminal sends the RTT packets at regular intervals, in order to obtain the round-trip delay in real time. As yet another example, a current RTT packet includes the time difference obtained from a previous RTT packet, so as to inform the data-reception terminal of the time difference, so that the data-reception terminal determines the round-trip delay based on the time difference. For example, the size of the RTT packet is within a certain range to reduce the impact of the traffic associated with the RTT packets on the transmission time and meet the real-time feedback requirements of the data-reception terminal. In another example, the time difference between the first time at which the data-transmission terminal sends the RTT packet and the second at which the data-transmission terminal receives the RTT response packet is directly used as the round-trip delay. In yet another example, the round-trip delay is determined based on multiple time differences measured within a predetermined time period so that the determined round-trip delay reflects the current actual network conditions and takes into consideration the impact of network jitters. In yet another example, the round-trip delay is an average value of two or more time differences measured within the predetermined time period. In yet another example, the round-trip delay is determined by conducting a weighted average calculation or other computations on two or more time differences measured within the predetermined time period.

According to some embodiments, in order to reduce the number of packets transmitted over the network, the data-reception terminal combines the RTT response packet and the packet-retransmission request into a data packet and sends the combined data packet to the data-reception terminal. For example, the RTT response packet is incorporated into the packet-retransmission packet, and the transmission time of the retransmission request is related to the measurement of the above-noted time differences. The RTT response packet is merged with other types of data packets without increasing the processing capacity of the data-transmission terminal, in certain embodiments.

In some embodiments, the data-transmission terminal 401 includes a traffic-determination module 4015 configured to determine a transmission traffic of the data-transmission terminal 401. For example, the transmission traffic of the data-transmission terminal includes a current traffic and a current average traffic within a first predetermined time period. In another example, the current traffic includes a first traffic of data packets, a second traffic of RTT packets and a third traffic of RTT response packets during a second predetermined time period. In yet another example, the current average traffic includes an average of a fourth traffic of data packets, a fifth traffic of RTT packets and a sixth traffic of RTT response packets during the first predetermined time period, the first predetermined time period being longer than the second predetermined time period.

In certain embodiments, after the traffic-determination module 4015 determines the transmission traffic of the data-transmission terminal 401, the transmission-strategy-determination module 4013 is configured to determine the data-packet-transmission strategy based on at least information associated with the transmission traffic of the data-transmission terminal. As an example, the data-packet-transmission strategy is determined based on at least information associated with the expectation-transmission-strategy information associated with the data-reception terminal, the transmission traffic of the data-transmission terminal, a predetermined traffic threshold and a delay jitter of the current round-trip delay. In some embodiments, the data-transmission terminal 401 and the data-reception terminal 402 are either installed on different devices or on a same device to perform packet transmission and packet reception simultaneously.

According to one embodiment, a method is provided for data transmission. For example, packet loss is detected based on at least information associated with a first data packet; and in response to packet loss being detected, a packet-retransmission request is sent to a data-transmission terminal and the packet-retransmission request is repeatedly sent to the data-transmission terminal during a retransmission life-cycle associated with the first data packet, the packet-retransmission request including a first identification of the packet-retransmission request. For example, the method is implemented according to at least FIG. 1 and/or FIG. 3.

According to another embodiment, a method is provided for data transmission. For example, a packet-retransmission request sent by a data-reception terminal is received, the packet-retransmission request including a first identification of the packet-retransmission request and a second identification of one or more first data packets that are lost; whether the packet-retransmission request is processed is determined based on at least information associated with the first identification; in response to the packet-retransmission request not being processed, the one or more first data packets are obtained based on at least information associated with the second identification and the one or more first data packets are sent to the data-reception terminal. For example, the method is implemented according to at least FIG. 2 and/or FIG. 3.

According to yet another embodiment, a data-reception terminal includes: a packet-reception module, a packet-loss-detection module, a life-cycle-determination module, and a retransmission-request module. The packet-reception module is configured to receive a first data packet sent by a data-transmission terminal. The packet-loss-detection module is configured to detect packet loss based on at least information associated with the first data packet. The life-cycle-determination module is configured to determine a retransmission life-cycle associated with the first data packet. The retransmission-request module is configured to, in response to packet loss being detected by the packet-loss-detection module, send a packet-retransmission request to the data-transmission terminal; and send the packet-retransmission request repeatedly to the data-transmission terminal during the retransmission life-cycle associated with the first data packet, the packet-retransmission request including a first identification of the packet-retransmission request. For example, the terminal is implemented according to at least FIG. 4.

In one embodiment, a data-transmission terminal includes: a retransmission-response module and a packet-transmission module. The retransmission-response module is configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification. The packet-transmission module is configured to, in response to the first packet-retransmission request not being processed, obtain the one or more first data packets based on at least information associated with the second identification and send the one or more first data packets to the data-reception terminal. For example, the terminal is implemented according to at least FIG. 4.

In another embodiment, a data transmission system includes a data-reception terminal and a data-transmission terminal. The data-reception terminal includes: a packet-reception module, a packet-loss-detection module, a life-cycle-determination module, and a retransmission-request module. The packet-reception module is configured to receive a first data packet sent by a data-transmission terminal. The packet-loss-detection module is configured to detect packet loss based on at least information associated with the first data packet. The life-cycle-determination module is configured to determine a retransmission life-cycle associated with the first data packet. The retransmission-request module is configured to, in response to packet loss being detected by the packet-loss-detection module, send a packet-retransmission request to the data-transmission terminal; and send the packet-retransmission request repeatedly to the data-transmission terminal during the retransmission life-cycle associated with the first data packet, the packet-retransmission request including a first identification of the packet-retransmission request. The data-transmission terminal includes: a retransmission-response module and a packet-transmission module. The retransmission-response module is configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification. The packet-transmission module is configured to, in response to the first packet-retransmission request not being processed, obtain the one or more first data packets based on at least information associated with the second identification and send the one or more first data packets to the data-reception terminal. For example, the system is implemented according to at least FIG. 4.

In yet another embodiment, a non-transitory computer readable storage medium includes programming instructions for data transmission. The programming instructions are configured to cause one or more data processors to execute certain operations. For example, packet loss is detected based on at least information associated with a first data packet; and in response to packet loss being detected, a packet-retransmission request is sent to a data-transmission terminal and the packet-retransmission request is repeatedly sent to the data-transmission terminal during a retransmission life-cycle associated with the first data packet, the packet-retransmission request including a first identification of the packet-retransmission request. For example, the storage medium is implemented according to at least FIG. 1 and/or FIG. 3.

In yet another embodiment, a non-transitory computer readable storage medium includes programming instructions for data transmission. The programming instructions are configured to cause one or more data processors to execute certain operations. For example, a packet-retransmission request sent by a data-reception terminal is received, the packet-retransmission request including a first identification of the packet-retransmission request and a second identification of one or more first data packets that are lost; whether the packet-retransmission request is processed is determined based on at least information associated with the first identification; in response to the packet-retransmission request not being processed, the one or more first data packets are obtained based on at least information associated with the second identification and the one or more first data packets are sent to the data-reception terminal. For example, the storage medium is implemented according to at least FIG. 2 and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A data-reception terminal comprising:
a packet-reception module configured to receive a first data packet sent by a data-transmission terminal;
a packet-loss-detection module configured to detect packet loss based on at least information associated with the first data packet;
a life-cycle-determination module configured to determine a retransmission life-cycle associated with the first data packet; and
a retransmission-request module configured to, in response to packet loss being detected by the packet-loss-detection module,
send a packet-retransmission request to the data-transmission terminal; and
send the packet-retransmission request repeatedly to the data-transmission terminal during the retransmission life-cycle associated with the first data packet, the packet-retransmission request including a first identification of the packet-retransmission request;
an round-trip time (RTT)-detection module configured to receive an RTT packet for testing the RTT delay sent by the data-transmission terminal and send an RTT response packet in response to the RTT packet;
wherein the RTT delay is determined based on at least information associated with a time difference between a first time at which the data-transmission terminal sends the RTT packet and a second time at which the data-transmission terminal receives the RTT response packet;
wherein the life-cycle-determination module is further configured to determine the retransmission life-cycle associated with the first data packet based on at least information associated with a RTT delay between the data-transmission terminal and a data-reception terminal and a time interval associated with packet transmission of the data-transmission terminal;
wherein the RTT delay is an average value associated with the time difference within a predetermined time period.

2. A data-reception terminal comprising:
a packet-reception module configured to receive a first data packet sent by a data-transmission terminal;
a packet-loss-detection module configured to detect packet loss based on at least information associated with the first data packet;
a life-cycle-determination module configured to determine a retransmission life-cycle associated with the first data packet; and
a retransmission-request module configured to, in response to packet loss being detected by the packet-loss-detection module,
send a packet-retransmission request to the data-transmission terminal; and
send the packet-retransmission request repeatedly to the data-transmission terminal during the retransmission life-cycle associated with the first data packet, the packet-retransmission request including a first identification of the packet-retransmission request;
an round-trip time (RTT)-detection module configured to receive an RTT packet for testing the RTT delay sent by the data-transmission terminal and send an RTT response packet in response to the RTT packet;
wherein the RTT delay is determined based on at least information associated with a time difference between a first time at which the data-transmission terminal sends the RTT packet and a second time at which the data-transmission terminal receives the RTT response packet;
wherein the life-cycle-determination module is further configured to determine the retransmission life-cycle associated with the first data packet based on at least information associated with a RTT delay between the data-transmission terminal and a data-reception terminal and a time interval associated with packet transmission of the data-transmission terminal;
wherein the RTT-detection module is further configured to combine the RTT response packet and the packet-retransmission request into a second packet and send the second data packet to the data-transmission terminal.

3. A data-reception terminal comprising:
a packet-reception module configured to receive a first data packet sent by a data-transmission terminal;
a packet-loss-detection module configured to detect packet loss based on at least information associated with the first data packet;

a life-cycle-determination module configured to determine a retransmission life-cycle associated with the first data packet;
a retransmission-request module configured to, in response to packet loss being detected by the packet-loss-detection module,
send a packet-retransmission request to the data-transmission terminal; and
send the packet-retransmission request repeatedly to the data-transmission terminal during the retransmission life-cycle associated with the first data packet, the packet-retransmission request including a first identification of the packet-retransmission request;
a packet-storage circular buffer configured to store the first data packet received by the packet-reception module; and
a lost-data-packet-sequence-number circular buffer configured to store one or more fourth packet sequence numbers associated with one or more fourth data packets that are lost;
wherein:
the packet-reception module is further configured to output a first packet sequence number associated with the first data packet;
the packet-loss-detection module is further configured to:
determine whether the first packet sequence number is in sequence with a second packet sequence number associated with a second data packet received immediately before the first data packet;
in response to the first packet sequence number being in sequence with the second packet sequence number, determine there is no packet loss;
in response to the first packet sequence number not being in sequence with the second packet sequence number,
determine there is packet loss; and
provide one or more third packet sequence numbers associated with one or more third data packets that are lost to the lost-data-packet-sequence-number circular buffer; and
the packet-retransmission request includes the one or more third sequence numbers.

4. The data-reception terminal of claim 3, wherein the life-cycle-determination module is further configured to determine the retransmission life-cycle associated with the first data packet based on at least information associated with a round-trip time (RTT) delay between the data-transmission terminal and a data-reception terminal and a time interval associated with packet transmission of the data-transmission terminal.

5. The data-reception terminal of claim 4, further comprising:
an RTT-detection module configured to receive an RTT packet for testing the RTT delay sent by the data-transmission terminal and send an RTT response packet in response to the RTT packet;
wherein the RTT delay is determined based on at least information associated with a time difference between a first time at which the data-transmission terminal sends the RTT packet and a second time at which the data-transmission terminal receives the RTT response packet.

6. The data-reception terminal of claim 3, wherein the life-cycle-determination module is further configured to determine the retransmission life-cycle associated with the first data packet based on at least information associated with a duration associated with one of more second data packets in a jitter buffer and a playback buffer.

7. The data-reception terminal of claim 3, further comprising:
a strategy-request-determination module configured to expectation-transmission-strategy information associated with the data-reception terminal;
wherein the packet-retransmission request includes the expectation-transmission-strategy information associated with the data-reception terminal.

8. The data-reception terminal of claim 3, further comprising:
one or more data processors; and
a computer-readable storage medium;
wherein one or more of the packet-reception module, the packet-loss-detection module, the life-cycle-determination module, and the retransmission-request module are stored in the storage medium and configured to be executed by the one or more data processors.

9. A data-transmission terminal comprising:
a retransmission-response module configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification;
a packet-transmission module configured to, in response to the first packet-retransmission request not being processed, obtain the one or more first data packets based on at least information associated with the second identification and send the one or more first data packets to the data-reception terminal;
an round-trip time (RTT)-detection module configured to:
send an RTT packet that tests an RTT time to the data-reception terminal;
receive an RTT response packet sent by the data-reception terminal in response to the RTT packet; and
determine the current RTT delay based on at least information associated with a first time at which the RTT packet is sent and a second time at which the RTT response packet is received;
a traffic-determination module configured to determine a transmission traffic of a data-transmission terminal;
wherein:
the transmission traffic of the data-transmission terminal includes a current traffic and a current average traffic within a first predetermined time period;
the current traffic includes a first traffic of data packets, a second traffic of RTT packets and a third traffic of RTT response packets during a second predetermined time period; and
the current average traffic includes an average of a fourth traffic of data packets, a fifth traffic of RTT packets and a sixth traffic of RTT response packets during the first predetermined time period, the first predetermined time period being longer than the second predetermined time period.

10. The data-transmission terminal of claim 9, further comprising:
a transmission-strategy-determination module configured to determine a data-packet-transmission strategy based on at least information associated with expectation-transmission-strategy information associated with the data-reception terminal and a current RTT delay, the expectation-transmission-strategy information associated with the data-reception terminal being included in the first packet-retransmission request;
wherein the packet-transmission module is further configured to send the one or more first data packets to the data-reception terminal based on at least information associated with the data-packet-transmission strategy.

11. The data-reception terminal of claim 9, wherein the data-packet-transmission strategy is determined based on at least information associated with the expectation-transmission-strategy information associated with the data-reception terminal, the transmission traffic of the data-transmission terminal, a predetermined traffic threshold and a delay jitter of the current RTT delay.

12. The data-transmission terminal of claim 9, wherein the second identification of the one or more first data packets corresponds to one or more sequence numbers associated with the first data packets.

13. The data-transmission terminal of claim 9, further comprising:
one or more data processors; and
a computer-readable storage medium;
wherein one or more of the retransmission-response module and the packet-transmission module are stored in the storage medium and configured to be executed by the one or more data processors.

14. A data-transmission terminal comprising:
a retransmission-response module configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification;
a packet-transmission module configured to, in response to the first packet-retransmission request not being processed, obtain the one or more first data packets based on at least information associated with the second identification and send the one or more first data packets to the data-reception terminal; and
a responded-retransmission-request circular buffer configured to store one or more third identifications of one or more third packet-retransmission requests that are processed;

wherein the retransmission-response module is further configured to:
search for the first identification in the responded-retransmission-request circular buffer;
in response to the first identification being in the responded-retransmission-request circular buffer, determine the first packet-retransmission request is processed; and
in response to the first identification not being in the responded-retransmission-request circular buffer, determine the first packet-retransmission request is not processed.

15. The data-transmission terminal of claim 14, further comprising:
an round-trip time (RTT-detection module configured to:
send an RTT packet that tests an RTT time to the data-reception terminal;
receive an RTT response packet sent by the data-reception terminal in response to the RTT packet; and
determine the current RTT delay based on at least information associated with a first time at which the RTT packet is sent and a second time at which the RTT response packet is received.

16. A data-transmission terminal comprising:
a retransmission-response module configured to receive a first packet-retransmission request sent by a data-reception terminal, the first packet-retransmission request including a first identification of the first packet-retransmission request and a second identification of one or more first data packets that are lost, and determine whether the first packet-retransmission request is processed based on at least information associated with the first identification; and
a packet-transmission module configured to, in response to the first packet-retransmission request not being processed, obtain the one or more first data packets based on at least information associated with the second identification and send the one or more first data packets to the data-reception terminal; wherein the retransmission-response module is further configured to add the first identification to the responded-retransmission-request circular buffer in response to the one or more first data packets being sent to the data-reception terminal.

* * * * *